United States Patent
Hasegawa et al.

(10) Patent No.: US 6,552,966 B2
(45) Date of Patent: Apr. 22, 2003

(54) RECORDING HEAD FOR OPTICAL RECORDING SYSTEM

(75) Inventors: Shinya Hasegawa, Kawasaki (JP); Wataru Odajima, Kawasaki (JP); Fumihiro Tawa, Kawasaki (JP); Nobuhide Aoyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/951,225

(22) Filed: Sep. 13, 2001

(65) Prior Publication Data

US 2002/0021627 A1 Feb. 21, 2002

Related U.S. Application Data

(63) Continuation-in-part of application No. PCT/JP99/02891, filed on May 31, 1999.

(51) Int. Cl.⁷ .................................................. G11B 11/00
(52) U.S. Cl. ................................. 369/13.13; 369/13.33
(58) Field of Search ....................... 369/13.13, 13.33, 369/13.28, 13.3, 112.01, 112.03, 112.04, 112.07

(56) References Cited

U.S. PATENT DOCUMENTS

| | | | | |
|---|---|---|---|---|
| 5,193,082 A | * | 3/1993 | Miyake et al. | 369/112 |
| 6,055,222 A | * | 4/2000 | Knight | 369/112 |
| 6,130,779 A | * | 10/2000 | Carlson et al. | 359/566 |
| 6,130,864 A | * | 10/2000 | Burroughs | 369/13 |
| 6,167,016 A | * | 12/2000 | Block et al. | 369/109 |
| 6,320,841 B1 | * | 11/2001 | Watanabe et al. | 369/13.13 |

FOREIGN PATENT DOCUMENTS

| | | |
|---|---|---|
| JP | 63-261557 | 10/1988 |
| JP | 04-159626 | 6/1992 |
| JP | 6-075309 | 3/1994 |
| JP | 07-225975 | 8/1995 |
| JP | 09-269329 | 10/1997 |
| JP | 09-312032 | 12/1997 |
| JP | 10-079137 | 3/1998 |
| JP | 10-269614 | 10/1998 |
| JP | 11-003534 | 1/1999 |
| JP | 11-007657 | 1/1999 |
| JP | 11-120641 | 4/1999 |
| JP | 11-176016 | 7/1999 |
| WO | WO96/27880 | 9/1996 |

* cited by examiner

Primary Examiner—Tan Dinh
(74) Attorney, Agent, or Firm—Greer, Burns & Crain, Ltd.

(57) ABSTRACT

The present invention relates to a recording head for recording information based on an optical magnetic recording system, and has an object of carrying out a high-density recording by reducing the beam diameter of an optical beam irradiated to a recording medium. When an optical beam having a larger diameter than that of the recording head is irradiated, this optical beam is condensed in a light guiding layer. The optical beam is further condensed with a sharp-headed chip. The condensed optical beam is emitted from an emission aperture smaller than the wavelength of the light at the front end of the chip, and irradiated to the recording medium.

6 Claims, 16 Drawing Sheets

RECORDING HEAD FOR OPTICAL RECORDING SYSTEM

This is a continuation of International Application No. PCT/JP99/02891, filed May 31, 1999.

TECHNICAL FIELD

The present invention relates to an information recording apparatus of an optical magnetic recording system for recording information on a recording medium based on both operations of light and magnetism, a recording head employed in this information recording apparatus, and a method of manufacturing this recording head.

BACKGROUND ART

In recent years, a recording medium and an information recording apparatus of an optical magnetic recording system have been widely distributed. In this optical magnetic recording system, a further high-density recording has been required, like in other information recording system.

In order to satisfy this requirement, focus has been placed on a magnetic field modulation system for modulating a magnetic field, in addition to an optical modulation system for modulating light.

FIG. 15 is a schematic diagram showing one conventional example of an optical magnetic recording system that employs both the optical modulation system and the magnetic field modulation system.

A recording medium 10 shown in the drawing is formed with a recording layer 12 for having information recorded on the surface of a light-transmissive substrate 11. A transparent protection layer 13 is formed on the surface of the recording layer 12 for protecting this recording layer.

A magnetic head 20 is disposed at a position close to the protection layer 12 (for example, with a gap of about 2 to 4 $\mu$m from the surface of the protection layer 12). The protection layer 13 has a thickness of about 5 to 10 $\mu$m. Therefore, the magnetic head 20 is disposed at a position of about 10 $\mu$m to 100 $\mu$m from the recording layer 12.

A magnetic coil 21 of this magnetic head 20 is input with a modulation signal S as shown in the drawing, and a modulation magnetic field is formed.

For carrying out a magnetic field modulation, it is necessary to dispose the magnetic head 20 at a position extremely close to the recording layer 12 like about 10 $\mu$m as described above. Therefore, an objective lens 31 for guiding a laser beam 30 to the recording layer 12 is disposed at a substrate 11 side. The laser beam 30 is irradiated from the substrate 11 side to the recording layer 12. In this example, the laser beam 30 is also modulated in recording information on the recording medium 10. This is called a laser pulse light-emission magnetic field modulation recording, which further improves the density of the tracks. Information is recorded on the recording layer 12 based on both operations of the magnetic field generated by the magnetic head 20 and the heating generated by the irradiation of the laser beam 30.

In order to achieve a high-density recording on the recording medium, it is necessary to increase the NA of the objective lens 31 and to form an extremely small light spot on the recording layer 12.

FIG. 16 is a schematic diagram showing one conventional example of forming an extremely small light spot on the recording medium.

As the objective lens, there are disposed a condensation lens 32 that is similar to the objective lens 31 shown in FIG. 15, and a semi-spherical lens 33, for example, that is called a solid immersion lens (SIL). Based on the use of the SIL 33, a laser beam 30a leaked from the SIL 33 to a position extremely near the SIL 33 is used as a light for recording on the recording medium 10. With this arrangement, it is possible to realize a certain level of high NA. From the viewpoint of only the light spot, it is considered possible to achieve a certain level of high-density recording.

However, this SIL 33 has a short depth of focus like a few $\mu$m to 100 nm or below. Therefore, when it is tried to apply the system shown in FIG. 15 to the magnetic field modulation system, it is necessary to dispose the objective lens and the magnetic coil including this SIL 33 at the same side of the recording medium. For this purpose, it is necessary to dispose a magnetic coil 34 on the bottom surface 33a of the SIL 33. Consequently, it becomes necessary to use a coil without a core for allowing the laser beam 30 to pass through. This has a problem that it is difficult to obtain a magnetic field that has strength necessary for the high-speed modulation.

DISCLOSURE OF THE INVENTION

In the light of the above situation, it is an object of the present invention to provide an information recording apparatus capable of realizing a high-density recording based on both operations of light and a magnetic field, a recording head that is suitable for use in this information recording apparatus, and a method of manufacturing this recording head.

In order to achieve the above object, according to the present invention, there is provided a recording head disposed between a light source and a recording medium. This recording head comprising: a magnetic head for generating a magnetic field toward the recording medium; and a light guide disposed on an optical path at the downstream of the magnetic head, for condensing an optical beam guided from the upstream of the magnetic head, and emitting this optical beam to the recording medium.

In the recording head of the present invention, it is preferable that the light guide comprising: a light guiding layer disposed on the optical path at the downstream of the magnetic head, for being incident with an optical beam guided from the upstream of the magnetic head; and a sharp-headed light guide disposed on the optical path at the downstream of the light guide, having a sharp head toward an aperture of the front end of the recording medium, for condensing an optical beam guided from the light guiding layer, and emitting the optical beam to the recording medium via the aperture.

In this case, it is preferable that the light guiding layer has a diffraction grating for guiding the optical beam to the optical-beam incident surface.

Further, according to the present invention, there is provided a recording head comprising: a light-transmissive substrate having a magnetic head made up of an embedded magnetic core, and a magnetic coil formed on an area surrounding the magnetic core on the surface facing the recording medium; a sharp-headed light guide with a sharp head toward the front end facing the recording medium, having a light-incident aperture for receiving an incidence of a light at a position with a predetermined distance from the front surface of the magnetic head that faces the recording medium, for condensing a light incident from the light-incident hole, and emitting the condensed light toward the recording medium from a light-emitting hole formed at the front end facing the recording medium; and a light guiding layer having the front surface facing the recording medium in contact with the light-incident hole, with the rear surface spread in contact with the front surface of the light-transmissive substrate, having an incident-light guide diffraction grating in the area in contact with the front surface of the light-transmissive substrate, and having a light-emission diffraction grating in the area in contact with the light-incident aperture, for introducing a light incident from the rear surface of the light-transmissive substrate via the incident-light guide diffraction grating, condensing the introduced light toward the light-incident hole, and emitting the condensed light toward the sharp-headed light guide via the light-emission diffraction grating.

The recording head has the above-described structure, and both the objective optical system and the magnetic coil are disposed at the same one side of the recording medium. Even when a light irradiated onto a portion of the magnetic head has been shielded by the magnetic head, only a small portion of the total optical beam is shielded. Therefore, it is possible to focus a light with sufficient intensity into an extremely small optical spot, and irradiate this focused beam onto the recording medium.

Moreover, based on the formation of the diffraction grating, it is possible to efficiently introduce the incident beam to the light guiding layer.

Further, according to the recording head of the present invention, it is possible to provide a magnetic head having a magnetic core. As compared with the conventional technique of providing a coil without a core, it is possible to increase the intensity of the magnetic field applied to the recording medium.

Further, according to the present invention, there is provided a method of manufacturing a recording head, the method comprising the steps of: forming an incident-light guide diffraction grating, and a groove for embedding a magnetic coil, on the surface of a light-transmissive substrate that is formed with a magnetic core embedding portion; embedding a magnetic core into the magnetic core embedding portion; forming a magnetic coil on the groove; forming a light guiding layer for introducing a light incident from the rear surface of the light-transmissive substrate to the front surface of the light-transmissive substrate after the magnetic coil has been formed, and condensing the introduced light at a light-condensing position facing the front surface of the magnetic coil; forming a diffraction grating for emitting a light condensed by the light guiding layer from the light guiding layer, at the light-condensing position facing the front surface of the magnetic coil on the surface of the light guiding layer; and forming a sharp-headed light guide having a sharp front end, for introducing a light condensed at the condensing position by the light guiding layer, and further condensing the light. It is possible to manufacture a recording head based on this manufacturing method, for example.

Further, according to the present invention, there is provided an information recording apparatus having a light source, and a recording head disposed between the light source and a recording medium, for recording information on the recording medium based on both operations of a heating on the recording medium by the light and magnetic force of a magnetic field, wherein the recording head comprising: a magnetic head for generating a magnetic field toward the recording medium; and a light guide disposed on an optical path at the downstream of the magnetic head, for condensing an optical beam guided from the upstream of the magnetic head, and emitting the condensed optical beam to the recording medium.

According to the information recording apparatus of the present invention, it is possible to carry out a high-density recording based on both operations of light and a magnetic field, regarding the magnetic head of the present invention as described above.

In the information recording apparatus of the present invention, the sharp-headed light guide has an aperture having a size of one half or below of the wavelength of a light emitted from the light source, as the light-emission aperture, for example.

Based on the forming of the extremely fine light-emission aperture in advance, it is possible to form an optical spot having an extremely small diameter on the recording medium, by irradiating a light leaked from this light-emission aperture onto the recording medium.

Moreover, in the information recording apparatus of the present invention, it is preferable to provide a slider mounted with the recording head and buoyant above the recording medium.

Based on the provision of a slider that has been conventionally used in the magnetic disk unit, for example, it is possible to dispose the recording head at a position extremely close to the recording medium for recording information.

Further, in the information recording apparatus of the present invention, it is preferable to provide a position control element for moving the recording head in parallel with the recording medium.

This positional control has also been carried out in the conventional optical disk unit to compensate for the eccentricity of the optical disk. It is also preferable to provide a mechanism for compensating for a relative positional deviation from the recording medium in the information recording apparatus of the present invention.

The information recording apparatus of the present invention also may be an apparatus for reading information recorded on the recording medium as well as recording information. This information recording apparatus may be structured such that the information recorded on the recording medium is read optically or magnetically, according to the characteristics and the like of the recording medium. For optically reading information, there is provided a reading head for optically picking up information recorded on the recording medium. For magnetically reading information recorded on the recording medium, there is provided a reading head for magnetically picking up information recorded on the recording medium.

As described above, according to the present invention, an optical magnetic recording system is employed, and it has become possible to carry out a high-density recording, and it has also become possible to further increase the recording capacity of the recording medium to a larger capacity. As a result, it is possible to reduce the cost of the recording medium per unit information volume.

In the present invention, as an optical near field is used, a short wavelength is not always necessary for the light source. When silicon is used at a light-transmission portion, for example, it becomes possible to use a semiconductor laser of 800 nm band.

BEST MODE FOR CARRYING OUT THE INVENTION

Figure 1:
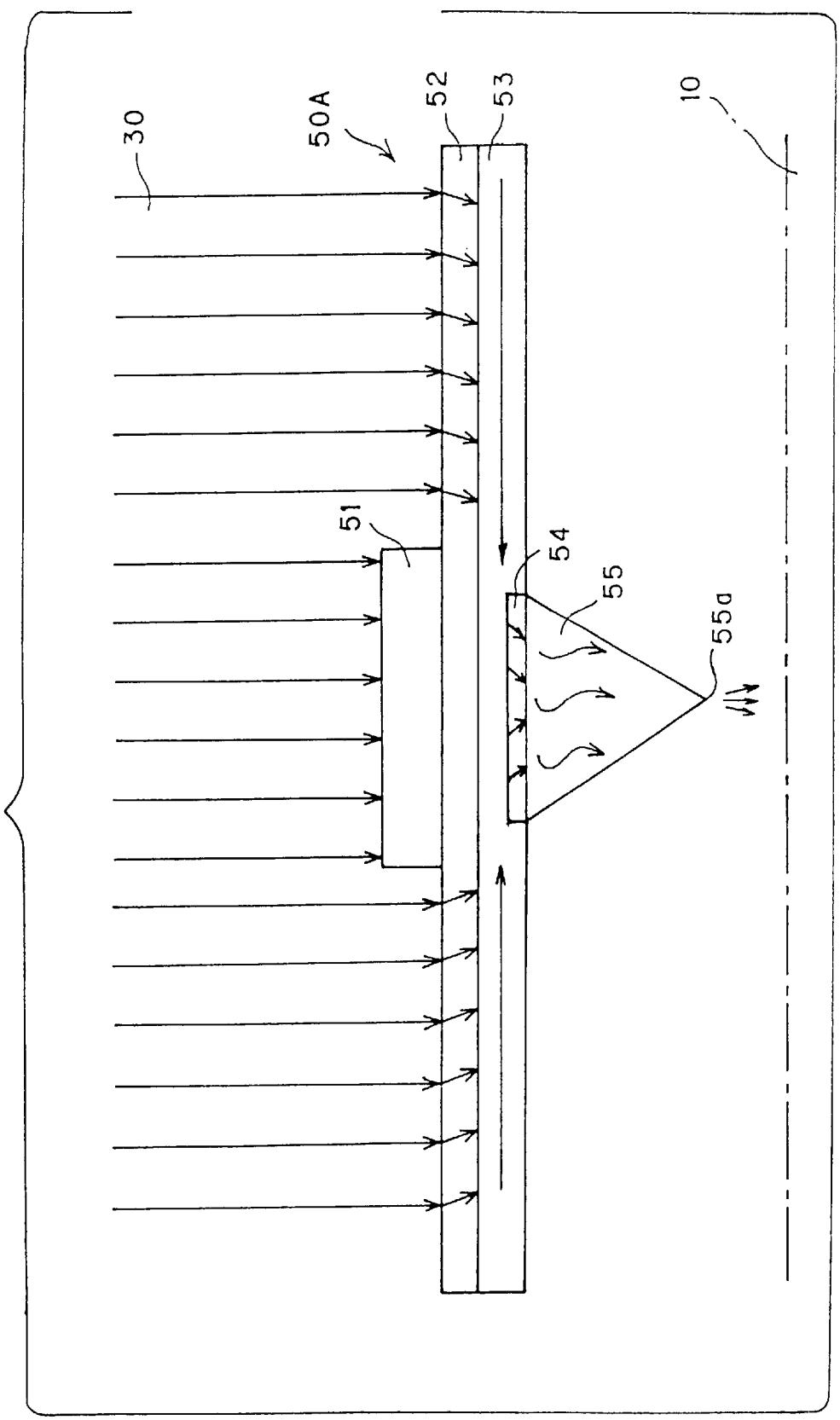
FIG. 1 is a structure diagram showing a recording head according to a first embodiment of the present invention.

FIG. 1 is a structure diagram showing a recording head according to a first embodiment of the present invention.

A recording head 50A comprises a magnetic head 51, a coupler layer 52, a light guiding layer 53, another coupler layer 54, and a chip 55.

In the present embodiment, the magnetic head 51 comprises an opaque magnetic core and a magnetic coil, for generating a magnetic field to be applied to a recording medium 10. An optical beam 30 having a larger diameter than that of the magnetic head 51 is irradiated from the rear surface side of the magnetic head 51 of which front surface faces the recording medium. This optical beam 30 is incident to the light guiding layer 53 via the coupler layer 52 except a portion shielded by the magnetic head 51. The incident optical beam has a beam diameter of 3 mmϕ, for example, and the portion shielded by the magnetic head 51 has a diameter of about 300 μmϕ, for example. The optical loss due to the shielding of the optical beam 30 by the magnetic head 51 is small. When the axicon optical system is used, it is possible to generate an optical beam having a ring-shaped energy distribution. Therefore, it is possible to use the light more efficiently. The coupler layer 52 includes a diffraction grating and the like, for example. This coupler layer 52 guides the light incident to the light guiding layer 53 to proceed through the light guiding layer 53 to the front surface of the magnetic head 51. The light guiding layer 53 focuses the light incident through the coupler layer 52 at a position facing the front surface of the magnetic head 51.

The light guided by the light guiding layer 53 and focussed at the position facing the front surface of the magnetic head 51 is incident to the chip 55 via the coupler layer 54. While the coupler layer 52, the light guiding layer 53, and the other coupler layer 54 have been explained as separate items, these three layers may be combined together into one layer as the light guiding layer of the present invention. The coupler layer 54 has a role of introducing the light condensed via the light guiding layer 53 to the chip 55, and comprises such as a diffraction grating like the coupler layer 52, for example. The chip 55 is a sharp-headed light guide having a sharp head toward the front end of the recording medium 10. The peripheral surface of the chip 55 is shielded excluding the portion of an aperture 55a formed at its front end. The light incident to the chip 55 via the coupler layer 54 is further condensed, and is directed to the front end of the recording medium 10. A part of this light is emitted toward the recording medium 10 from the aperture 55a formed at the front end of the chip. The size of the aperture 55a at the front end of the chip is extremely fine that is equal to or less than one half of the wavelength λ of the optical beam 30, such as, for example, 50 nm. From this aperture 55a, an optical beam finer than the wavelength λ that exceeds the diffraction limit called the optical near field is emitted, and is incident to the recording medium 10.

The beam size of the optical beam emitted from the chip 55 is fine, and the intensity of the optical beam that reaches the recording medium 10 is lowered substantially, when the distance between the front end of the chip 55 and the recording medium 10 exceeds about 10 nm. Therefore, for recording information on the recording medium 10 by irradiating the optical beam, it is necessary to keep this distance to about 100 nm or less.

In the present embodiment, the distance between the magnetic head 51 and the front end of the chip 55 is about within 10 to 100 μm. A magnetic core is used for this magnetic head 51, and this can apply a magnetic field of sufficient intensity to the recording medium 10 disposed close to the front end of the chip 55. As described above, based on the employment of the recording head as shown in FIG. 1, it is possible to irradiate an optical beam of sufficient intensity and having an extremely fine diameter to the recording medium 10. As a result, it is possible to apply a magnetic field having sufficient intensity to the recording medium 10. Thus, it is possible to realize an optical magnetic modulation recording at high speed and in high density.

Figure 2:
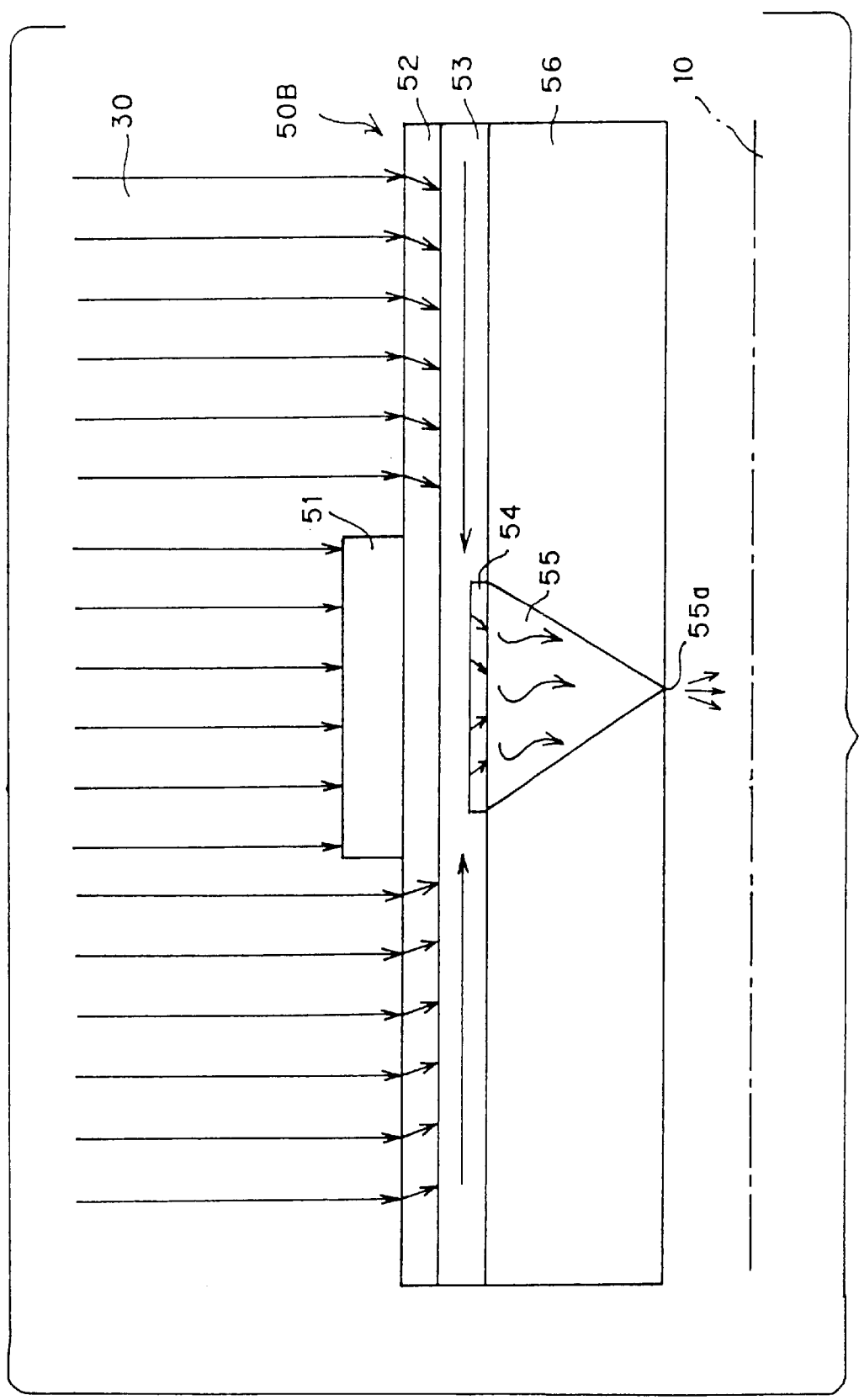
FIG. 2 is a structure diagram showing a recording head according to a second embodiment of the present invention.

FIG. 2 is a structure diagram showing a recording head according to a second embodiment of the present invention.

A recording head 50B shown in FIG. 2 is different from the recording head 50A shown in FIG. 1 in that a protection light-shielding layer 56 is formed on the recording head 50B shown in FIG. 2.

As described above, according to this recording head, the front end of the chip 55 and the recording medium 10 are disposed extremely close to each other, with a distance of 100 nm or less between the two. Therefore, there is a risk that the magnetic head is brought into contact with the recording medium 10. In the case of the recording head 50A having a structure as shown in FIG. 1, there is a risk that the front end of the chip 55 is brought into contact with the recording medium 10, and the front end of the chip 55 is broken off, or scratches and hurts the surface of the recording medium 10. This protection light-shielding layer 56 is formed in a height to reach the same level as the front end of the chip 55. Therefore, this protection light-shielding layer 56 protects the front end of the chip 55 when the recording head 50B is brought into contact with the recording medium 10. Further, as the contact area is expanded, this can prevent the recording medium 10 from being hurt. Furthermore, this protection light-shielding layer 56 shields the peripheral surface of the chip 55 excluding the portion of the aperture 55a at the front end of the chip 55, and the lower surface of the light guiding layer 53, from light. As a result, it is possible to prevent a generation of a stray light from the lower surface of the light guiding layer 53 or the peripheral surface of the chip 55.

Figure 3:
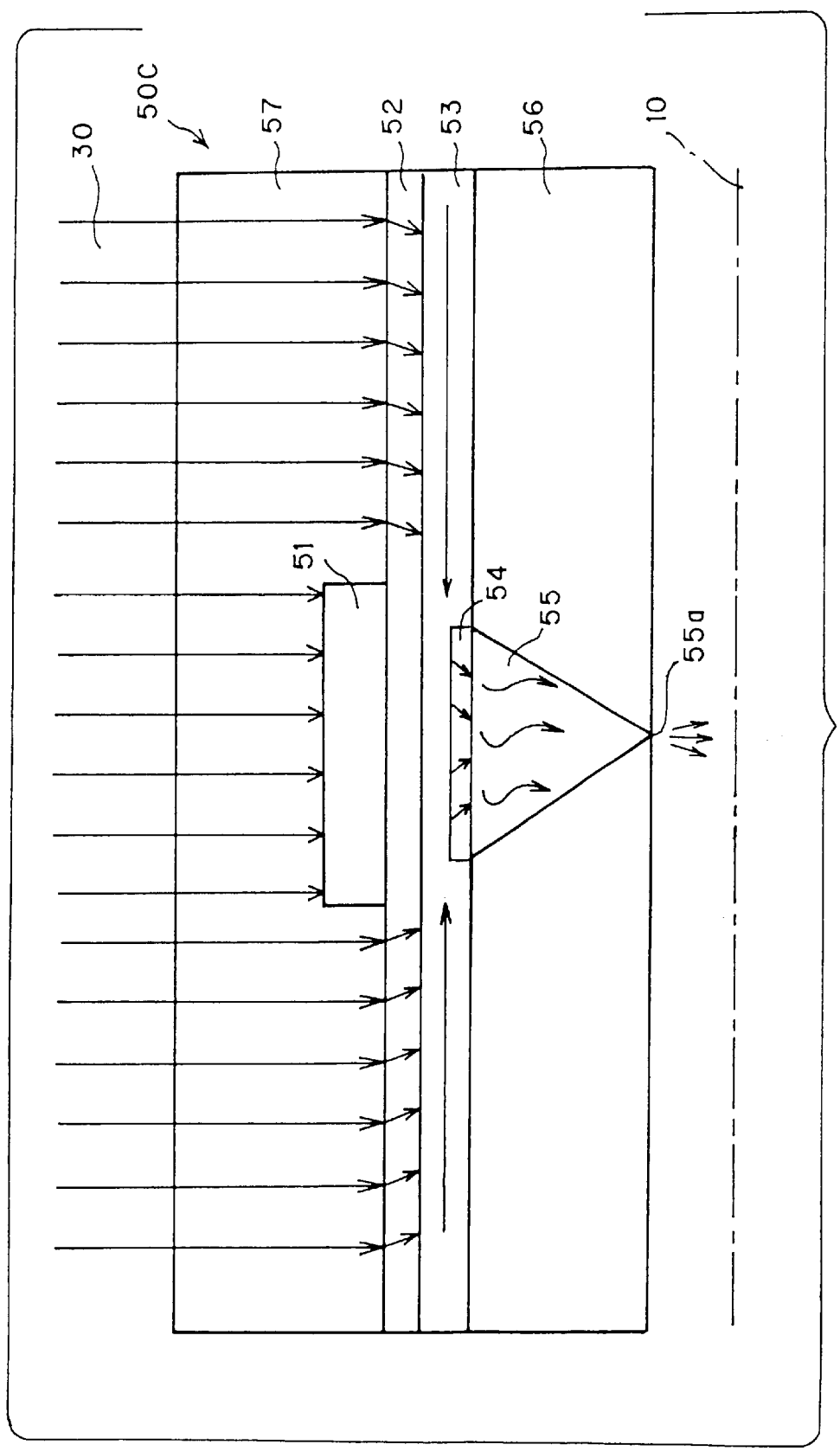
FIG. 3 is a structure diagram showing a recording head according to a third embodiment of the present invention.

FIG. 3 is a structure diagram showing a recording head according to a third embodiment of the present invention.

A recording head 50C shown in FIG. 3 is different from the recording head of the second embodiment shown in FIG. 2 in that a magnetic head 51 in the recording head 50C shown in FIG. 3 is embedded into a transparent substrate 57 (such as a silicon substrate or a glass substrate). Based on the existence of this substrate 57, the position of the magnetic head 51 is stabilized, and a coupler layer 52 and the like are integrated more securely. As a result, it is possible to form a recording head that can realize an integrated block shape.

Figure 4:
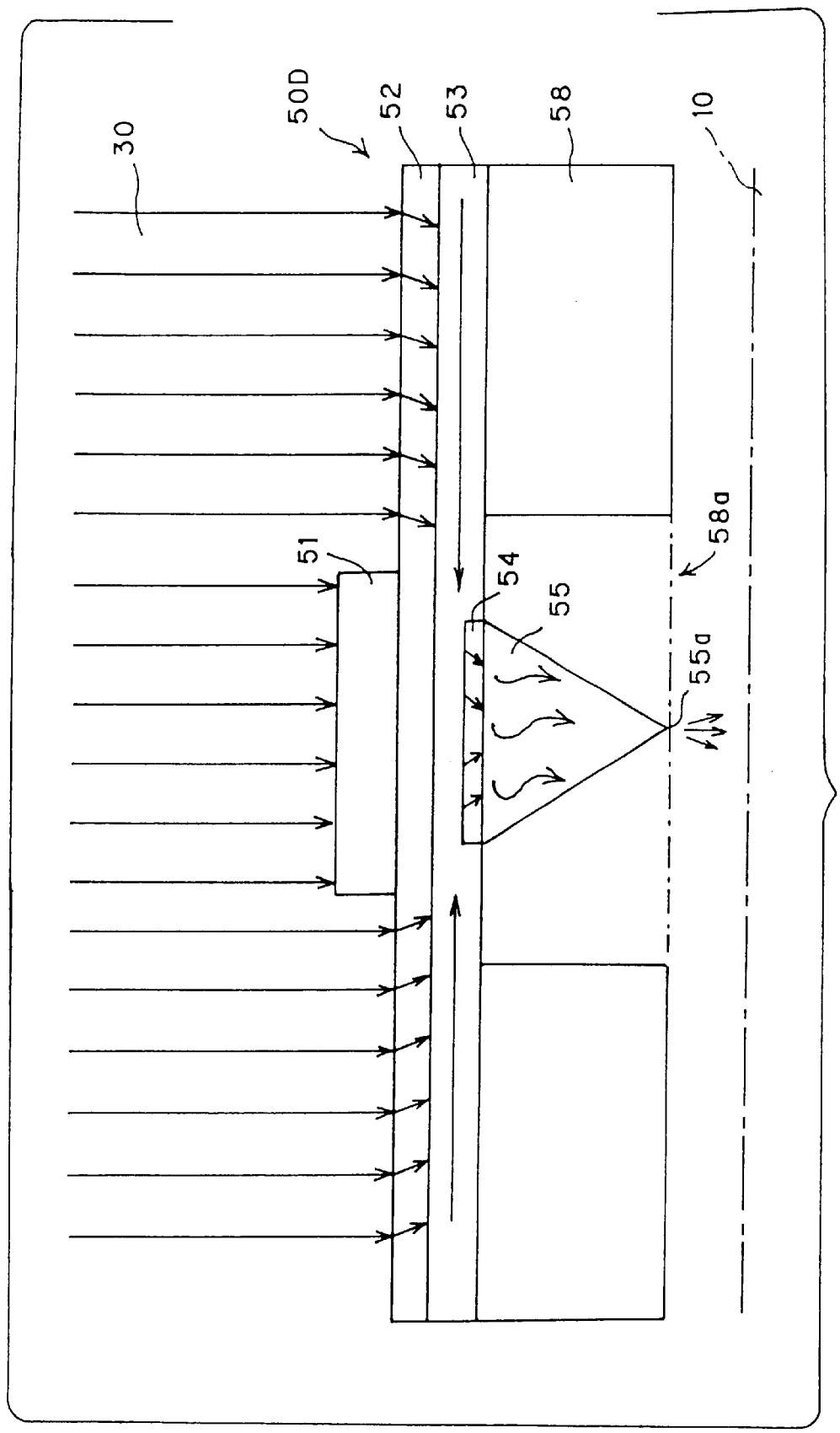
FIG. 4 is a structure diagram showing a recording head according to a fourth embodiment of the present invention.

FIG. 4 is a structure diagram showing a recording head according to a fourth embodiment of the present invention.

A recording head 50D is provided with a protection light-shielding layer 58 having a height to reach the front end of a chip 55, like in the case of the recording head 50B shown in FIG. 2. This protection light-shielding layer 58 is formed with a hole 58a at a disposition portion of the chip 55. This is for preventing the chip 55 from being affected, and protecting the chip 55 when it is brought into contact with a recording medium 10.

Figure 5:
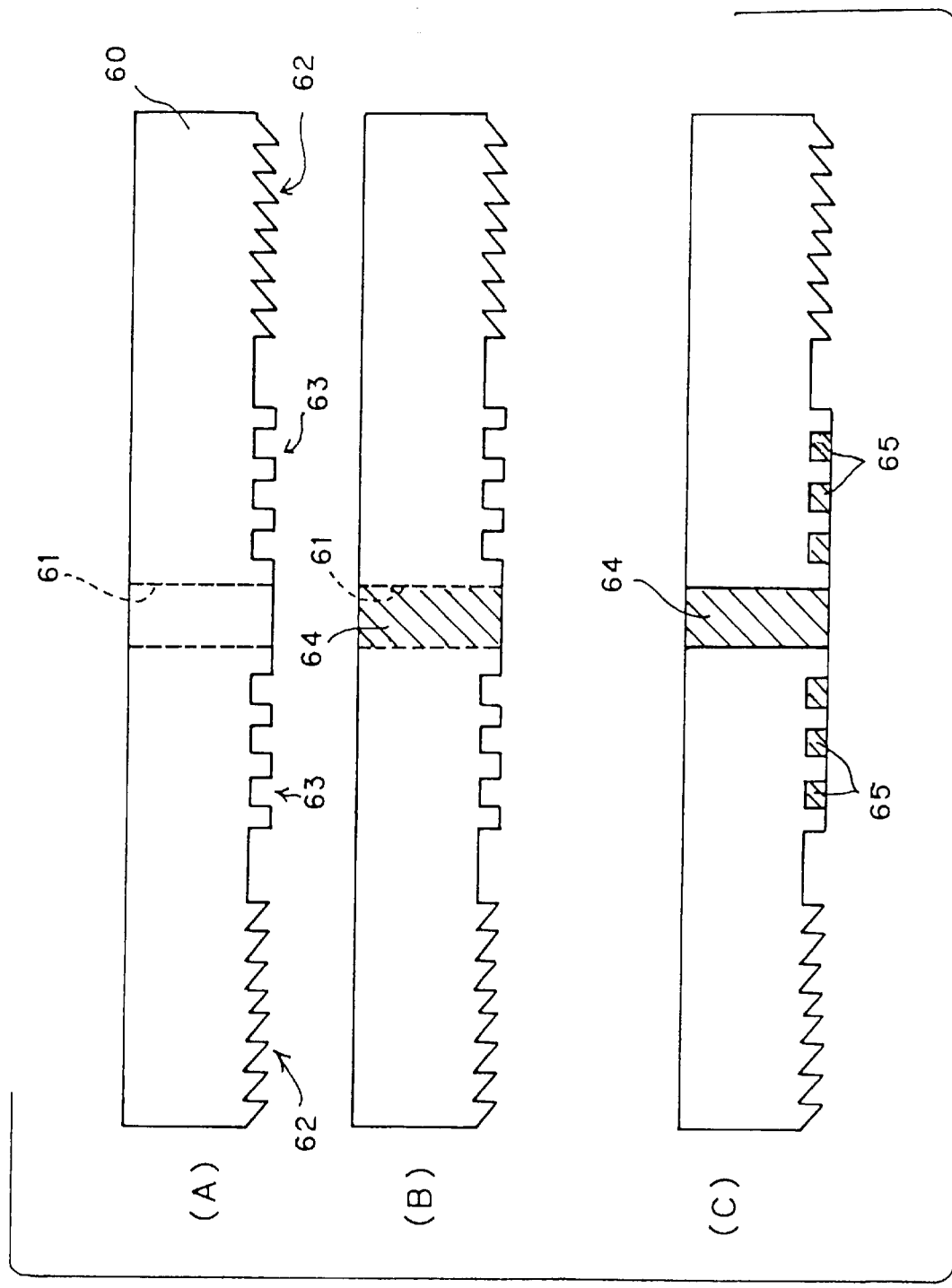
FIG. 5 is a process diagram showing one example of a method of manufacturing a recording head.
Figure 6:
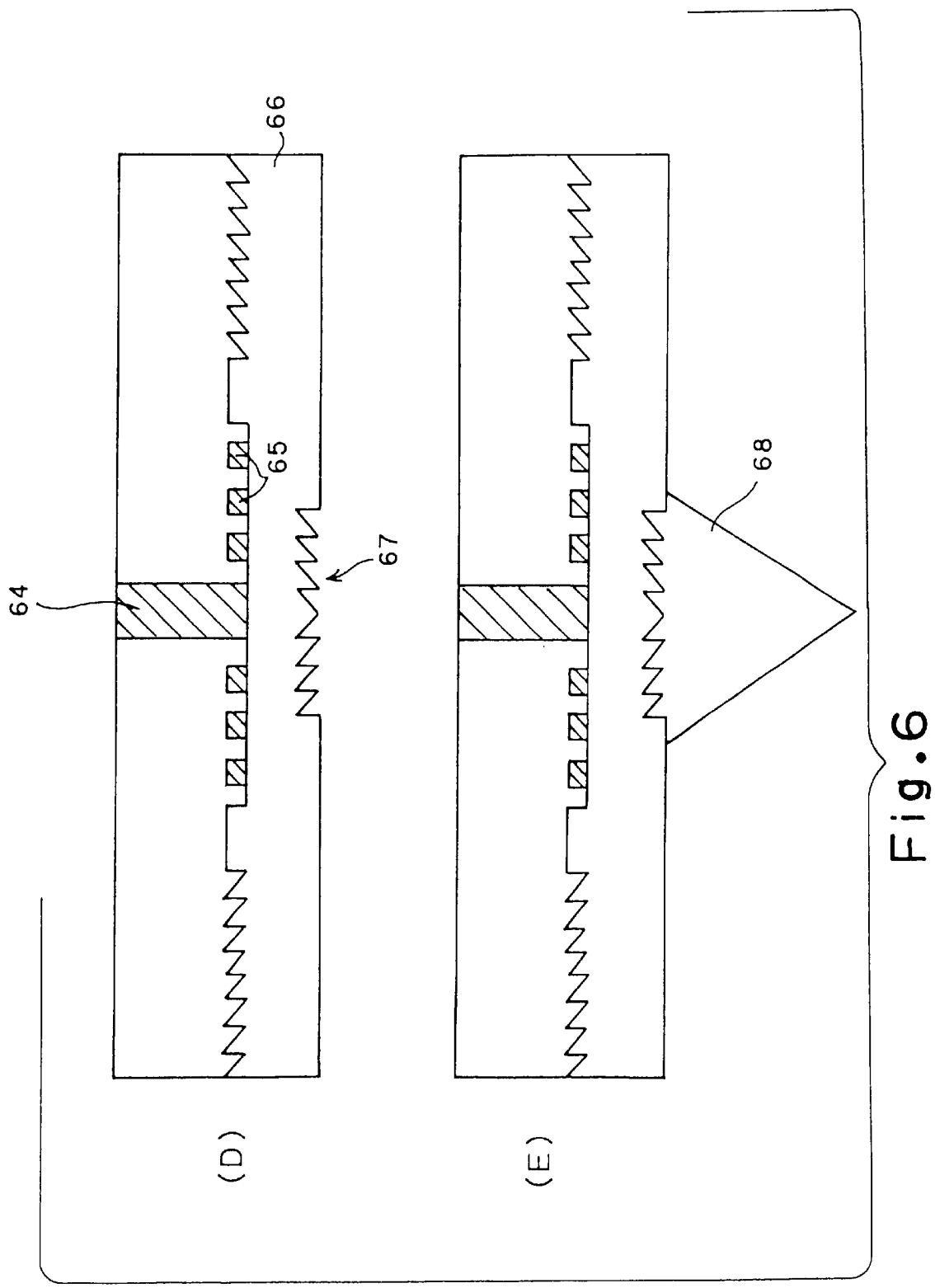
FIG. 6 is a process diagram showing one example of a method of manufacturing a recording head.
Figure 7:
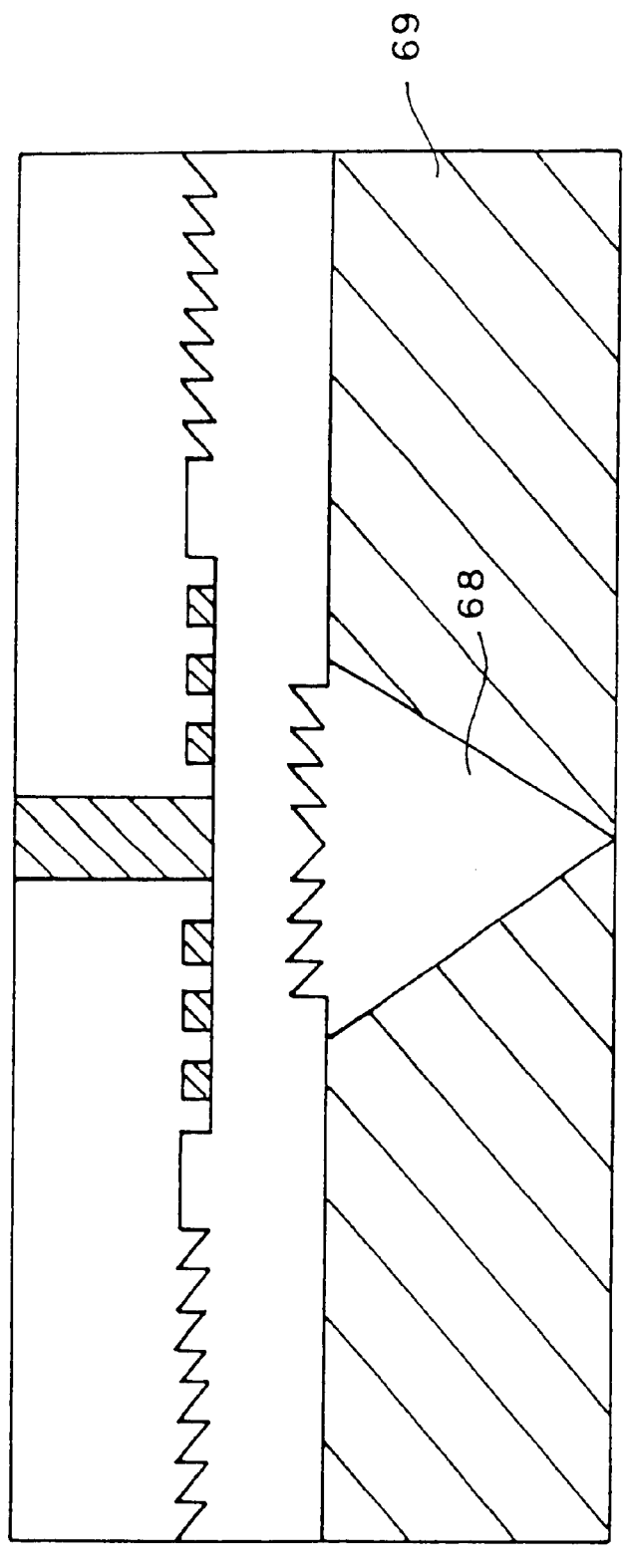
FIG. 7 is a process diagram showing one example of a method of manufacturing a recording head.

FIG. 5 to FIG. 7 are process diagrams showing one example of a method of manufacturing a recording head.

First, a substrate 60 (such as a glass substrate or a silicon substrate of quartz and the like) is prepared, with a hole 61 formed at the center for inserting a magnetic core through it. On the surface of this substrate, there are prepared by etching or the like, a diffraction grating 62 as a coupler for determining a light proceeding path, and fine grooves 63 for embedding a magnetic coil (FIG. 5(A)).

Next, within the fine grooves 63, a magnetic core 64 is embedded into the hole 61 at the center (FIG. 5(B)). In this case, the surface of the magnetic core 64 at the side where the diffraction grating 62 and the like are formed has an embedded height that matches the height of the surface of the substrate 60.

Next, a thin-film coil 65 made of a conductive material (Ni, Cu or the like) is formed by etching (FIG. 5(C)).

At this stage, a magnetic head is structured with the magnetic core 64 and the thin-film coil 65. The external diameter of the thin-film coil 65 becomes a diameter of the magnetic head.

Next, glass or silicon is evaporated to form a light guiding layer 66 which refractive index is larger than one in the material 60. Further, a diffraction grating 67 is formed by etching at a portion facing the magnetic core 64 (FIG. 6(D)).

Next, a chip 68 having a sharp end is fitted (FIG. 6(E)). This chip 68 may be prepared by evaporating glass or silicon and the like at a portion of the diffraction grating 67 again and then by etching.

Further, a protection light-shielding layer 69 is formed to cover the peripheral surface of the chip 68, and in the same height as that of the front end of the chip 68 (FIG. (F)).

The recording head of the present invention can be manufactured based on the above process, for example.

Figure 8:
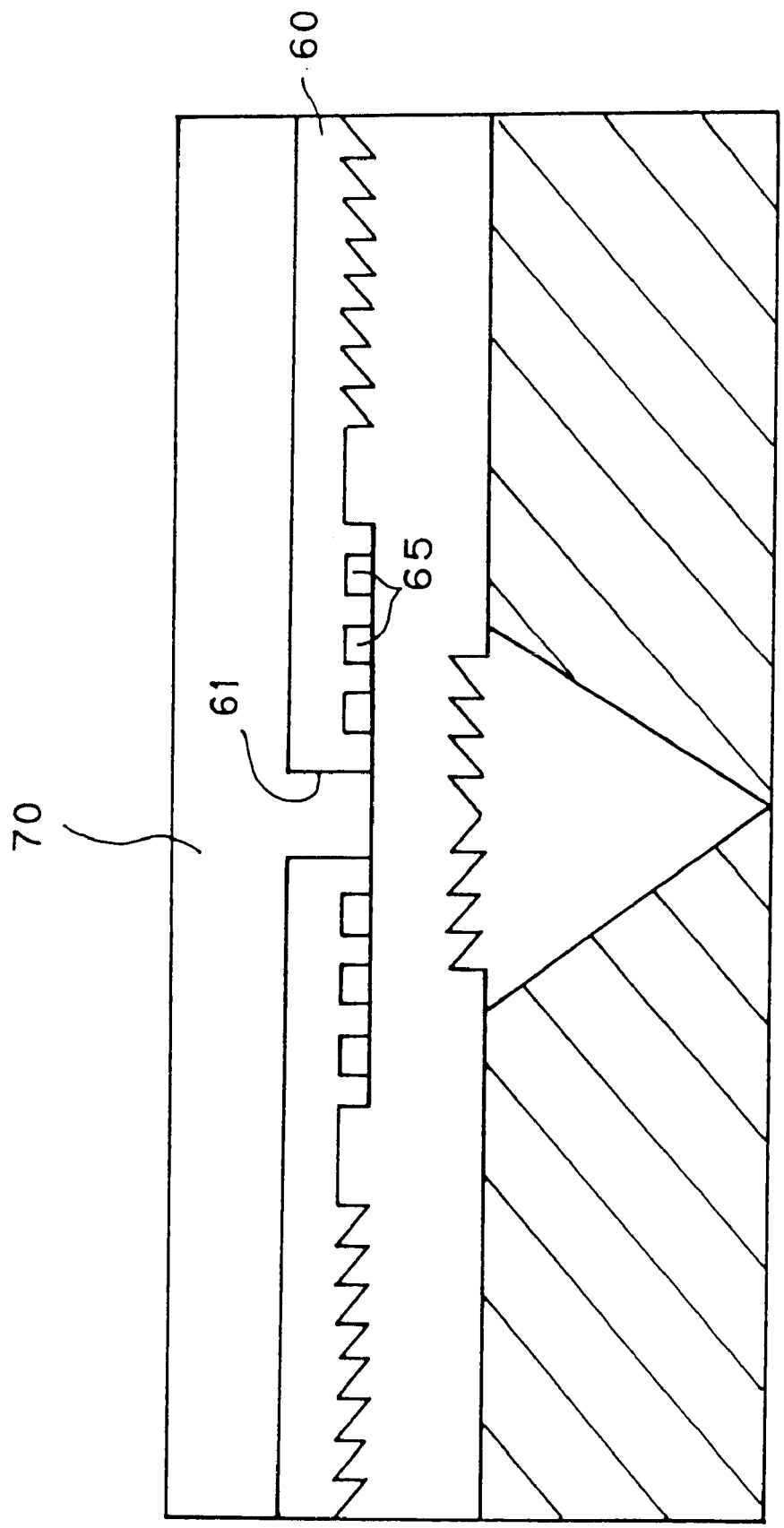
FIG. 8 is a process diagram showing another example of a method of manufacturing a recording head.

FIG. 8 is a process diagram showing another example of a method of manufacturing a recording head.

First, a substrate 70 comprising a light-transmissive Faraday element is prepared, and a pillar is formed by etching and the like to stretch to a portion of a magnetic core as shown in FIG. 8. Then, a glass or silicon substrate 60 is formed to have a height reaching the front end of the pillar. Thereafter, a recording head is manufactured through a process similar to that explained with reference to FIG. 5 to FIG. 7. In this case, a thin-film coil 65 may be formed using a light-transmissive conductive material.

Based on the preparation of the magnetic core using a Faraday element as described above, it is not necessary to embed the magnetic core as shown in FIG. 5(B), which facilitates the manufacturing of the recording head. As the light-transmissive Faraday element 70 and the thin-film coil 65 are employed, there is a possibility that the light utilization efficiency is improved.

Figure 9:
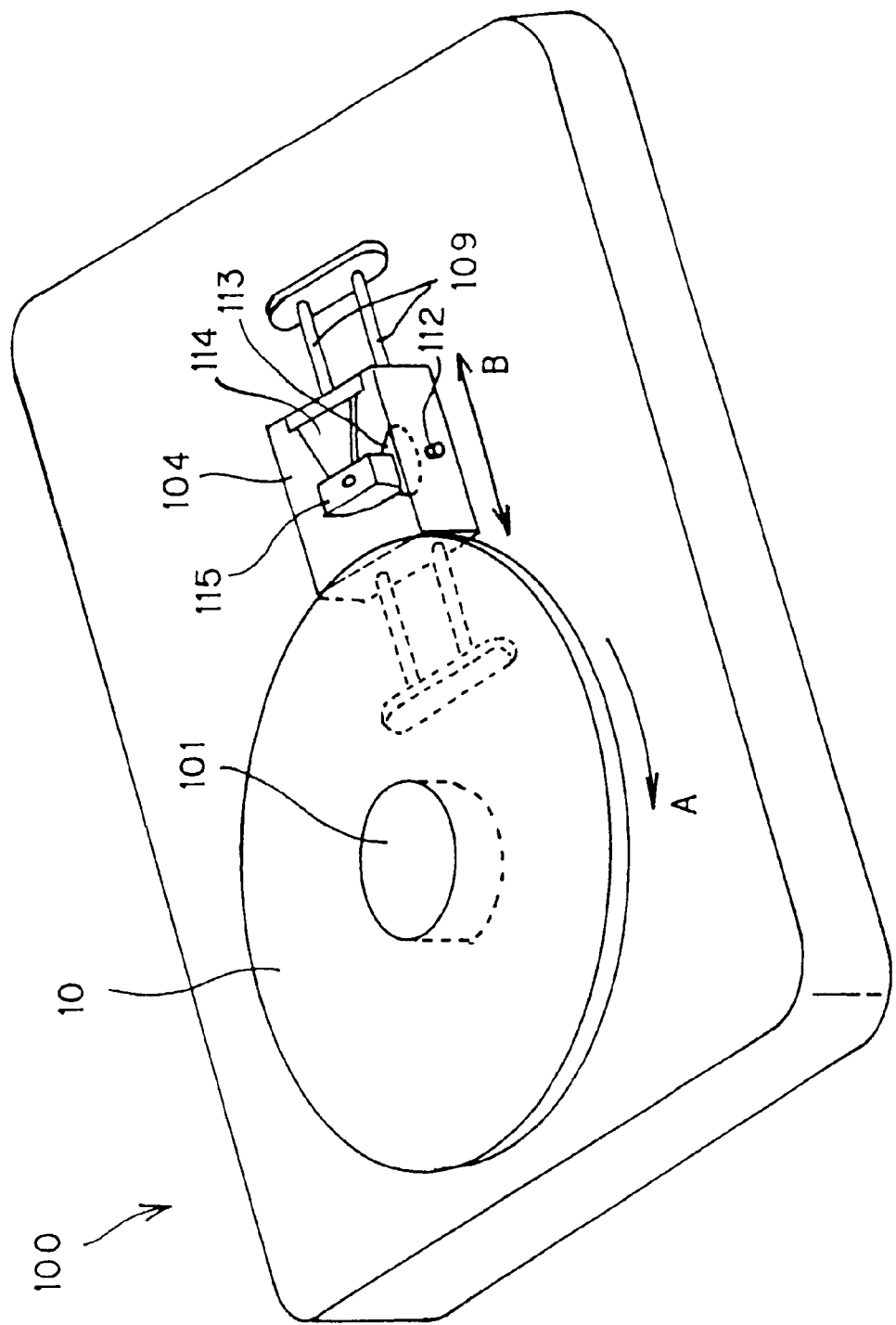
FIG. 9 is a perspective view of an information recording apparatus according to one embodiment of the present invention.

FIG. 9 is a perspective view of an information recording apparatus according to one embodiment of the present invention.

An information recording apparatus 100 is mounted with a disk-shaped recording medium 10. This information recording apparatus 100 rotates the mounted recording medium 10 around a rotation axis 101 in an arrow A direction. This information recording apparatus 100 is provided with a carriage 104 that can freely proceed to arrow B directions on rails 109. A slider 115 is provided at the front end of the carriage 104 via a suspension 114. The slider 115 is mounted with a magnetic head as one example of the present invention.

Figure 10:
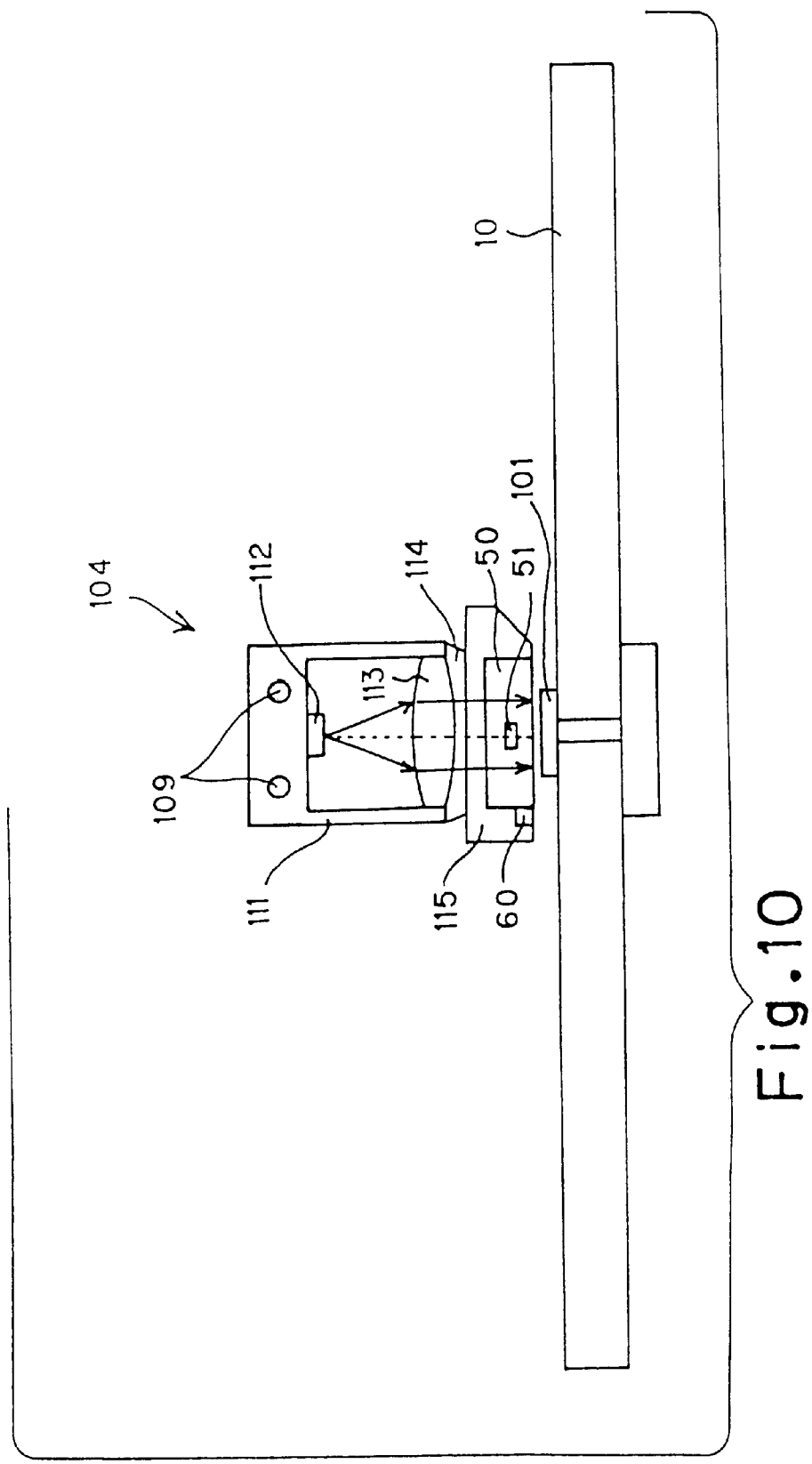
FIG. 10 is a diagram showing a head of an information recording apparatus, and a recording medium mounted on the information recording apparatus.

FIG. 10 is a diagram showing the carriage 104 and the slider 115 of the information recording apparatus 100, and the recording medium 10 mounted on this information recording apparatus 100 shown in FIG. 9, viewed from the side. In FIG. 10, the up and down positions of the parts shown in FIG. 9 are reversed.

The carriage 104 can move freely on the rails 109 in a vertical direction relative to the sheet in FIG. 10. This carriage 104 is provided with a frame 111, a laser diode 112 fixed to the bottom of the frame 111, a collimator lens 113 fixed to the aperture of the frame 111, a suspension 114 extending from the carriage 104, and the slider 115 fixed to the front end of the suspension 114. This slider 115 is provided with a recording head 50 as the recording head according to one embodiment of the present invention, and a magnetic reading head 60 fixed adjacent to the recording head 50. This slider 115 is slightly buoyant above the recording medium 10 based on the flow of air on the recording medium 10 when the recording medium 10 rotates around the rotation axis 101. A laser beam emitted from the laser diode 112 is collimated with the collimator lens 113, and becomes a parallel magnetic flux. An optical beam of a fine diameter is irradiated onto the recording medium 10 via the recording head 50. Information is recorded on the recording medium 10 based on both operations of the optical beam and the magnetic field generated by the magnetic head 51. This recording medium 10 is a magnetic disk of a type for recording information by using assistance of the laser beam. For reproducing information recorded on the recording medium 10, a magnetic reading head 60 for the magnetic disk such as a GMR head, or a spin bulb head is used.

Figure 11:
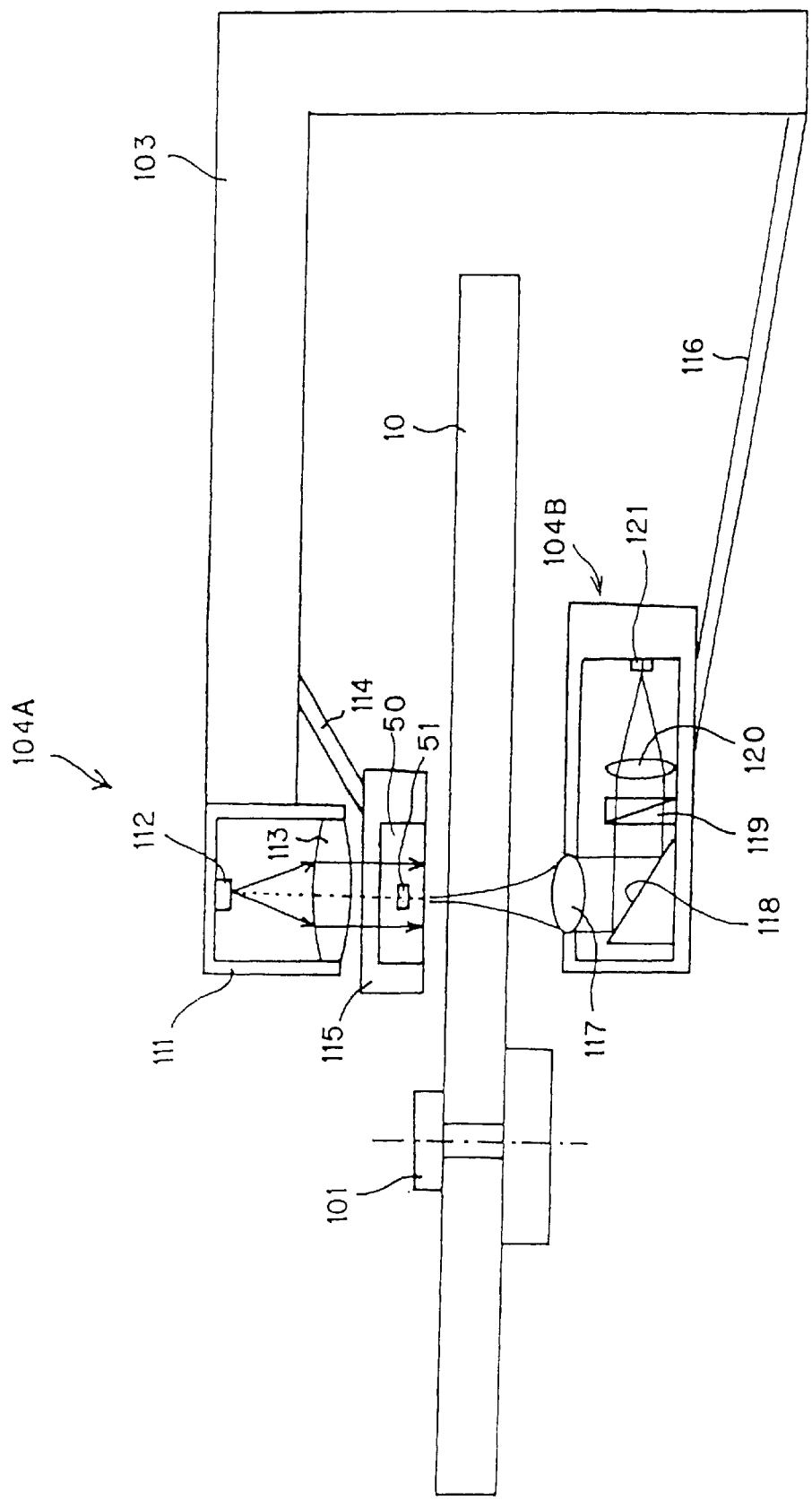
FIG. 11 is a diagram showing another example of a head of an information recording apparatus.

FIG. 11 is a diagram showing another example of a carriage portion of an information recording apparatus.

A recording medium 10 shown in FIG. 11 records information based on a system using both light and magnetism, and reproduces information based on an optical system.

The information recording apparatus shown in FIG. 11 matches the type of this recording medium 10. A head 104A, having a structure similar to that of the carriage 104 and the slider 115 shown in FIG. 10, fixed to the front end of a carriage 103 is not equipped with the magnetic reading head 60. Instead, a reading head 104B for carrying out an optical reproduction is provided.

This reading head 104B is fixed to a front end of a suspension 116 of which one end is fixed to the carriage 103. This reading head 104B is provided with an objective lens 117, a reflection mirror 118, a Wollaston prism 119, a condensing lens 120, and an optical sensor 121. This carriage 103 moves via rails not shown in FIG. 11, in a similar manner to that of the carriage 114 shown in FIG. 9.

A laser diode 112 also emits light during a reproduction time. An optical beam of a fine beam diameter is irradiated onto the recording medium 10 via the recording head 50. The light that has been transmitted through the recording medium 10 and that bears the information recorded on the recording medium 10 is reflected by the reflection mirror 118 via the objective lens 117. The reflected light is divided according to a diffraction direction of the light by the Wollaston prism 119. The light is then received by an optical sensor 121 via the condensing lens 120. An optical signal received by the optical sensor 121 is transferred to a circuit not shown. This circuit reproduces the information recorded on the recording medium 10. In this case, a reproduction system similar to that of the optical disk is assumed, and a detailed explanation of this reproduction system will be omitted.

As explained above, the information recording apparatus employing the recording head of the present invention employs both the magnetic reproduction system and the optical reproduction system according to the characteristic of the recording medium, for reproducing the information from the recording medium.

Figure 12:
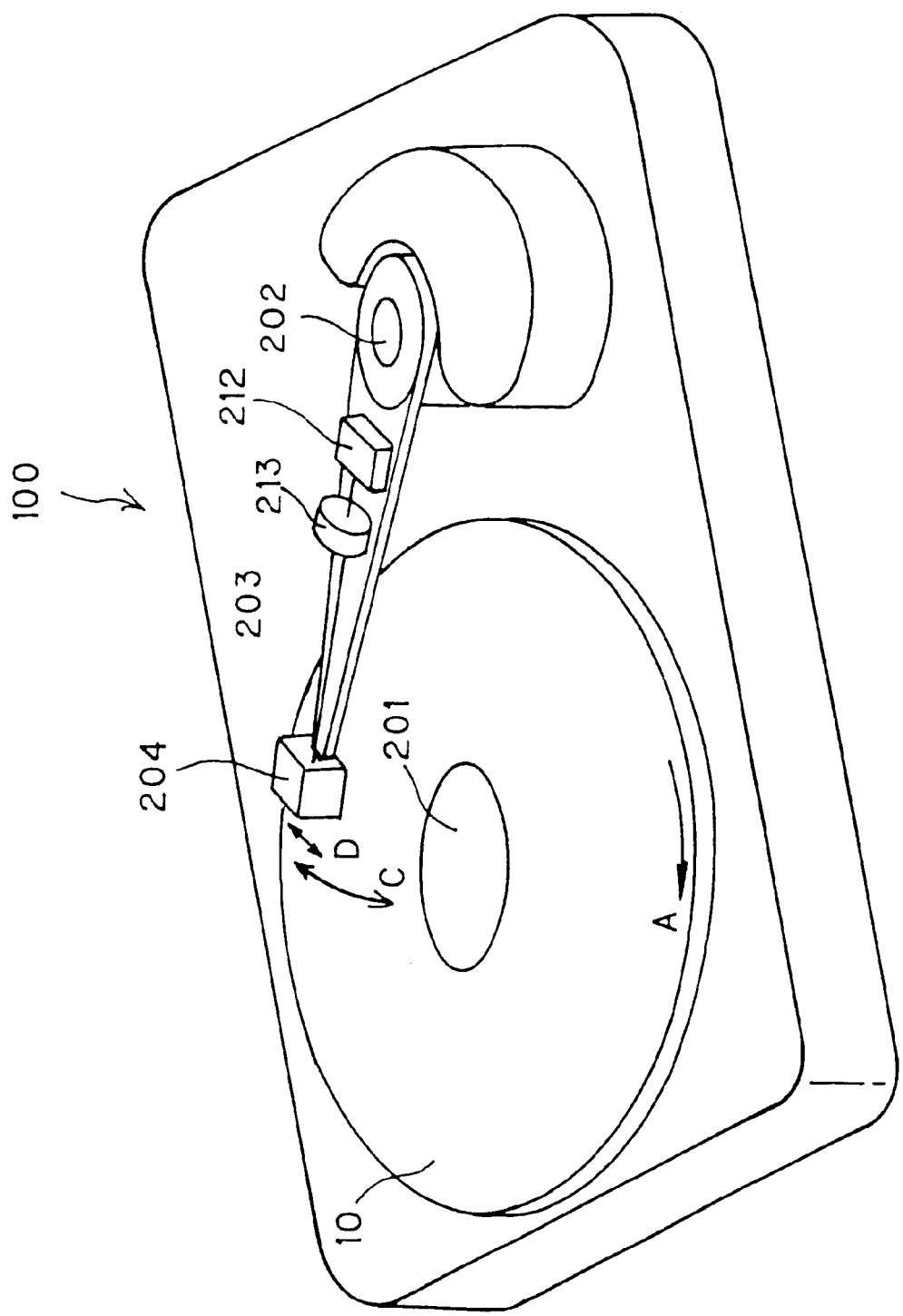
FIG. 12 is a diagram showing still another example of an information recording apparatus of the present invention.
Figure 13:
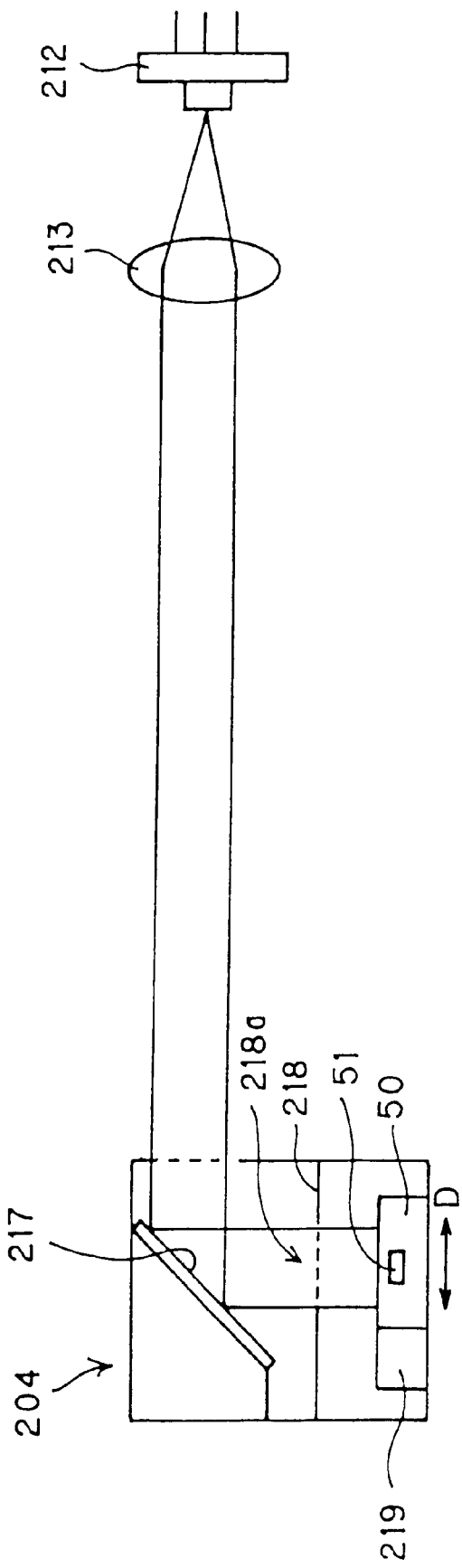
FIG. 13 is a diagram showing an optical system of the information recording apparatus shown in FIG. 12.

FIG. 12 is a diagram showing still another example of an information recording apparatus of the present invention, and FIG. 13 is a diagram showing an optical system of this information recording apparatus.

An information recording apparatus 200 is mounted with a disk-shaped recording medium 10. This information recording apparatus 200 rotates the mounted recording medium 10 around a rotation axis 201 in an arrow A direction. This information recording apparatus 200 is provided with an arm 203 that can freely move in arrow C directions. A head portion 204 is provided at the front end of the arm 203. The head portion 204 is mounted with a magnetic head as one example of the present invention.

According to the example shown in FIG. 12 and FIG. 13, a laser diode 212 and a collimator lens 213 are not provided in the header portion 204, but are fixed to the arm 203. A light emitted from the laser diode 212 is collimated with the collimator lens 213, and becomes a parallel light. The light is incident to the head portion 204, and is reflected by a mirror 217 provided in the head portion 204. The light is then incident to a slider unit 218 via an aperture 218a of the unit 218 in which a magnetic head 215 is disposed. An optical beam of a fine diameter is irradiated onto the recording medium 10 via a recording head 50 as the recording head according to one embodiment of the present invention. Information is recorded on the recording medium 10 based on both operations of the optical beam and the magnetic field generated by the magnetic head 51. In order to accurately track the recording head 50 to a predetermined position, there is provided an actuator 219 for moving the recording head 50 to an arrow D direction to bring the recording head 50 to the center of the track. This actuator 219 is input with a servo signal obtained from a track servo control system on the recording medium 10 that detects a sample servo pattern not shown with a reproduction signal and carries out a track servo. According to this servo signal, the actuator 219 finely moves the recording head 50 to the arrow D direction along the surface of the recording medium. A technique of a track servo for an optical disk, for example, can be used for the track servo control system. A detailed explanation of this technique will be omitted here.

Figure 14:
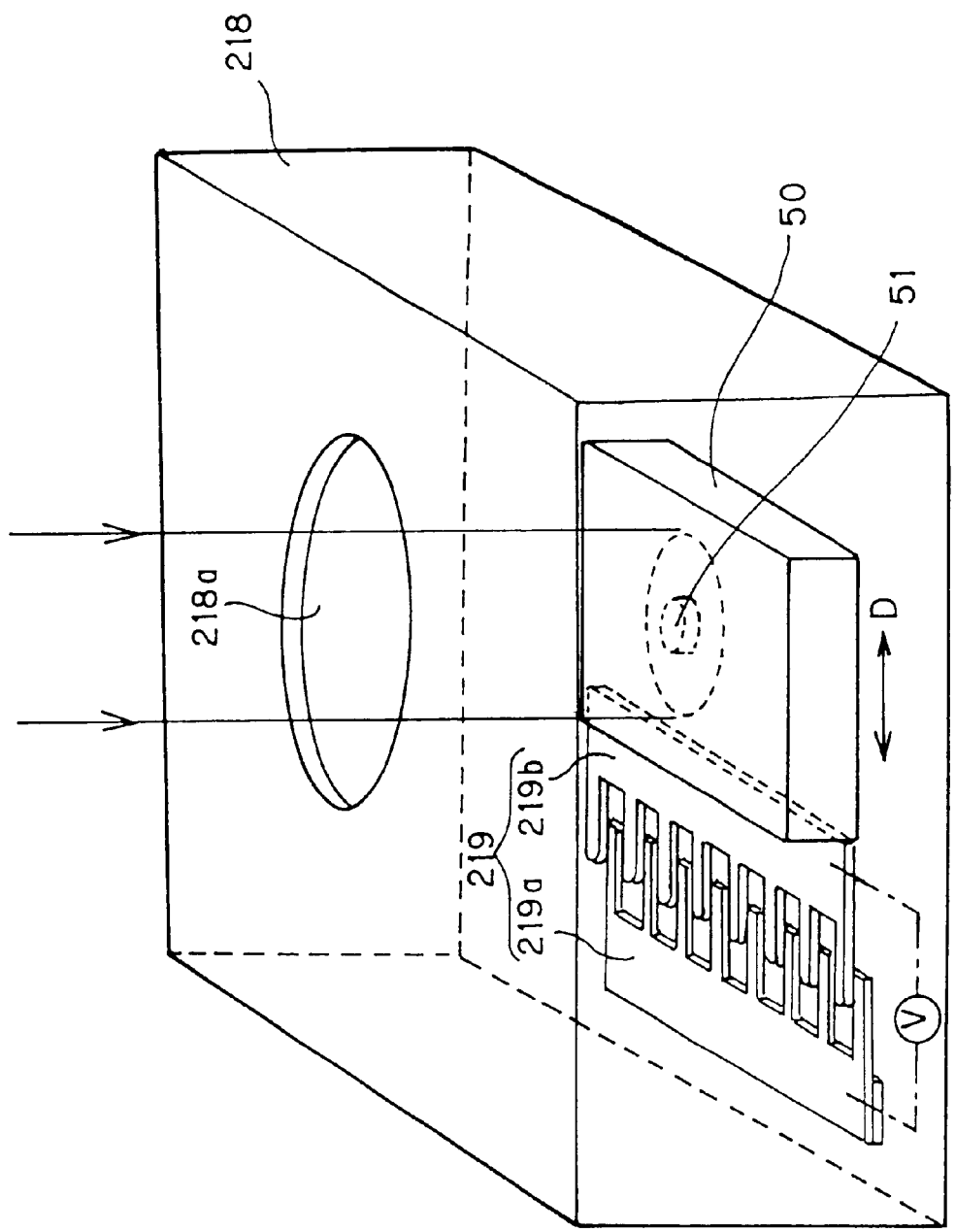
FIG. 14 is an enlarged schematic view of portions of a unit that constitute a head 204 shown in FIG. 12.
Figure 15:
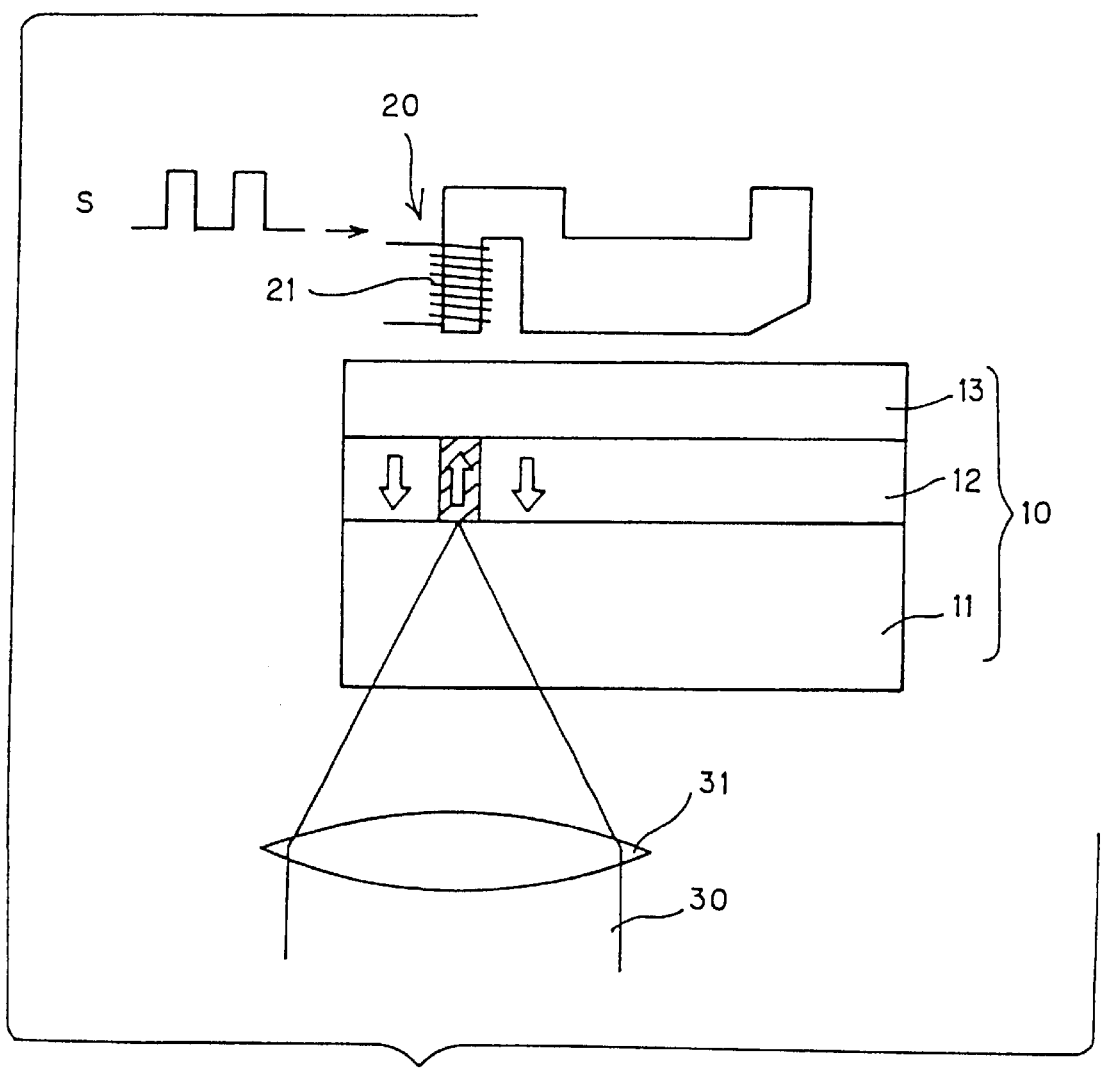
FIG. 15 is a schematic view showing one conventional example of an optical magnetic recording system using both an optical modulation system and a magnetic field modulation system.
Figure 16:
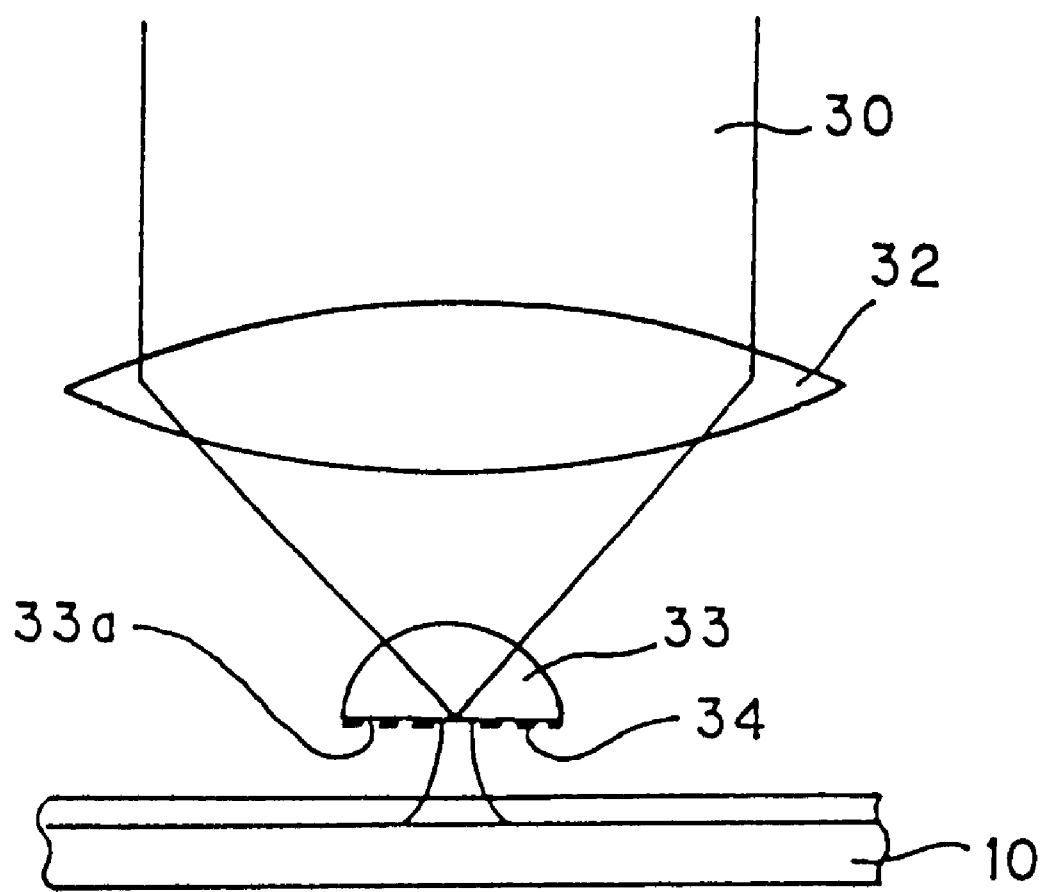
FIG. 16 is a schematic view showing one technical example of forming an extremely small optical spot on a recording medium.

FIG. 14 is an enlarged schematic view of portions of the slider unit 218 that constitute the head portion 204 shown in FIG. 12.

An electrostatic actuator having a pair of comb-tooth shaped electrodes 219a and 219b is shown as the actuator 219. The electrode 219a as one of the pair of the comb-tooth shaped electrodes 219a and 219b is fixed to the unit 218. The other electrode 219b is fixed to the recording head 50, and can slide finely to the arrow D direction together with the recording head 50. When a voltage V is applied to between the pair of comb-tooth shaped electrodes 219a and 219b, the comb-tooth shaped electrode 219b fixed to the recording head 50 slides to a position corresponding to the polarity and the value of the voltage V. At the same time, the recording head 50 also slides to a corresponding position.

When a track servo is carried out by moving the recording head 50 to the arrow D direction with the actuator 219, it becomes possible to record information at an accurate position on the recording medium.

Although the electrostatic actuator has been explained as an example, it is also possible to use a piezoelectric actuator using a piezoelectric element in place of the electrostatic actuator.

Further, a description has been made of a case where a track servo is carried out by sliding a recording head to a direction along the surface of a recording medium with an actuator. It is also possible to carry out a focal servo control by moving the recording head to a vertical direction with respect to the recording medium as well. A focal servo technique for an optical disk can be used for the focal servo, for example. A detailed explanation of this technique will be omitted here. It is needless to mention that the system of moving the recording head along the surface of the recording medium with the actuator and the system of moving the recording head to a direction vertical to the recording medium can be also applied to the system of moving the recording head on the rails as shown in FIG. 9.

What is claimed is:

1. A recording head disposed between a light source and a recording medium, the recording head comprising:

a magnetic head for generating a magnetic field toward the recording medium; and a light guide disposed on an optical path at the downstream of the magnetic head, for condensing an optical beam guided from the upstream of the magnetic head, and emitting this optical beam to the recording medium.

2. A recording head according to claim 1, wherein the light guide comprises:

a light guiding layer disposed on the optical path at the downstream of the magnetic head, for receiving an incident optical beam guided from the upstream of the magnetic head; and a sharp-headed light guide disposed on the optical path at the downstream of the light guide, having a sharp head toward an aperture of the front end facing the recording medium, for condensing an optical beam guided from the light guiding layer, and emitting the optical beam to the recording medium via the aperture.

3. A recording head according to claim 2, wherein the light guiding layer has a diffraction grating for guiding the optical beam to a surface on which the optical-beam is incident.

4. A recording head comprising:

a light-transmissive substrate having a magnetic head made up of an embedded magnetic core, and a magnetic coil formed on an area surrounding the magnetic core on the surface facing toward the recording medium;

a sharp-headed light guide with a sharp head toward the front end facing the recording medium, having a light-incident aperture for receiving an incidence of a light at a position with a predetermined distance from the front surface of the magnetic head that faces the recording medium, for condensing a light incident from the light-incident hole, and emitting the condensed light toward the recording medium from a light-emitting hole formed at the front end facing the recording medium; and a light guiding layer having the front surface facing toward the recording medium in contact with the light-incident hole, with the rear surface spread in contact with the front surface of the light-transmissive substrate, having an incident-light guide diffraction grating in the area in contact with the front surface of the light-transmissive substrate, and condensing a light incident from the rear surface of the light-transmissive substrate via the incident-light guide diffraction grating toward the light-incident hole, and emitting the condensed light toward the sharp-headed light guide via a light-emission diffraction grating.

5. A method of manufacturing a recording head, the method comprising the steps of:

forming an incident-light guide diffraction grating, and a groove for embedding a magnetic coil, on the surface of a light-transmissive substrate that is formed with a magnetic core embedding portion;

embedding a magnetic core into the magnetic core embedding portion;

forming a magnetic coil on the groove;

forming a light guiding layer for introducing a light incident from the rear surface of the light-transmissive substrate to the front surface of the light-transmissive substrate after the magnetic coil has been formed, and condensing the introduced light at a light-condensing position facing the front surface of the magnetic coil;

forming a diffraction grating for emitting a light condensed by the light guiding layer from the light guiding layer, at the light-condensing position facing the front surface of the magnetic coil on the surface of the light guiding layer; and forming a sharp-headed light guide having a sharp front end, for introducing a light condensed at the condensing position by the light guiding layer, and further condensing the light.

6. An information recording apparatus having a light source, and a recording head disposed on an optical path between the light source and a recording medium, for recording information on the recording medium based on both operations of a heating on the recording medium by the light and magnetic force of a magnetic field, wherein the recording head comprises:

a magnetic head for generating a magnetic field toward the recording medium; and a light guide disposed on an optical path at the downstream of the magnetic head, for condensing an optical beam guided from the upstream of the magnetic head, and emitting the condensed optical beam to the recording medium.

* * * * *